INVENTORS
DONALD E. MERRITT
RALPH H. KRESS
BY JACKSON C. MEDLEY

ATTORNEYS

Patent document page

3,322,464
DOOR MECHANISM AND HYDRAULIC CONTROL THEREFOR
Donald E. Merritt, Peoria Heights, Ralph H. Kress, Peoria, and Jackson C. Medley, East Peoria, Ill., assignors to Caterpillar Tractor Co., Peoria, Ill., a corporation of California
Filed June 23, 1965, Ser. No. 466,177
3 Claims. (Cl. 298—23)

This invention relates to vehicles having dump bodies with rear tailgates and particularly to the means for opening and closing the tailgate and to its configuration and to the means for pivotally supporting it with respect to the vehicle body.

It is the object of the present invention to provide an improved tailgate for a vehicle dump body capable of swinging open to a position which affords good clearance with respect to the ground and provides protection from discharging material for a large area of the gate. Another object resides in the provision of versatile hydraulic controls for opening and closing the gate automatically in desired relationship to raising and lowering of the dump body, or alternately for enabling operation of the gate under some circumstances independently of the position of the dump body. Further and more specific objects and advantages of the invention and the manner in which it is carried into practice are made apparent in the following specification by reference to the accompanying drawings.

Figure 1:
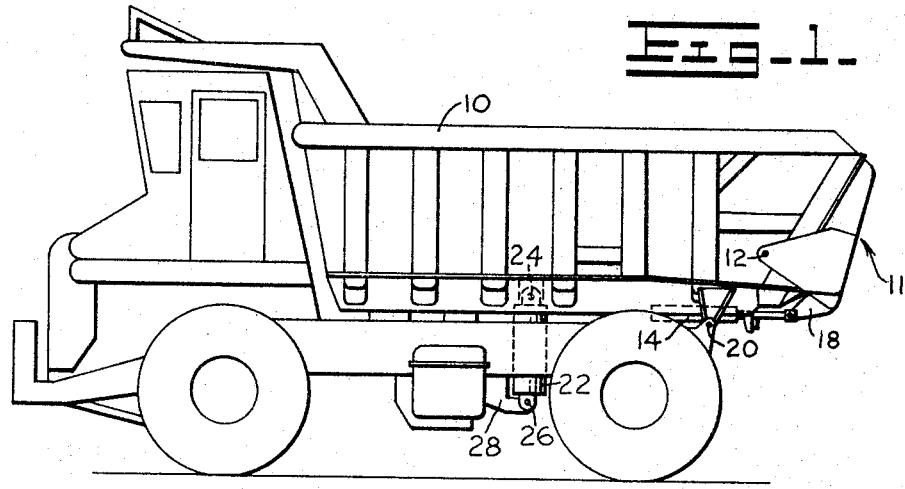
Figure 2:
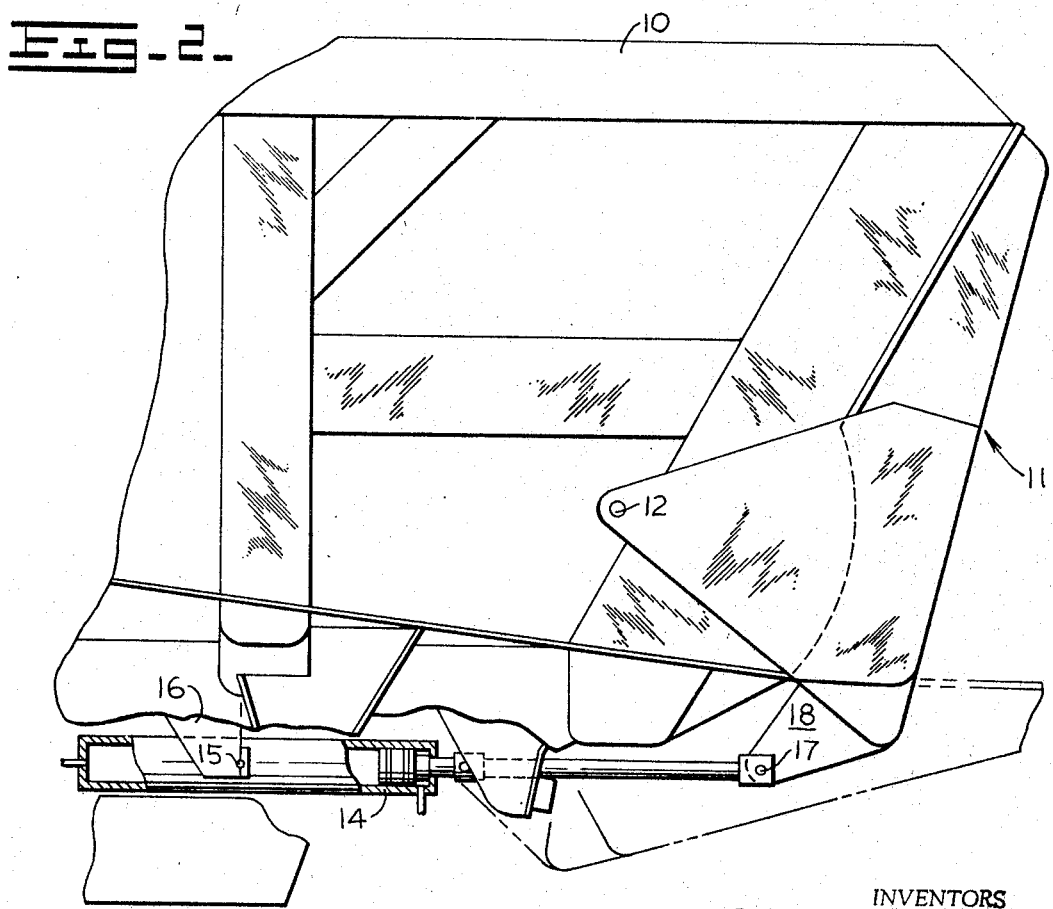
Figure 3:
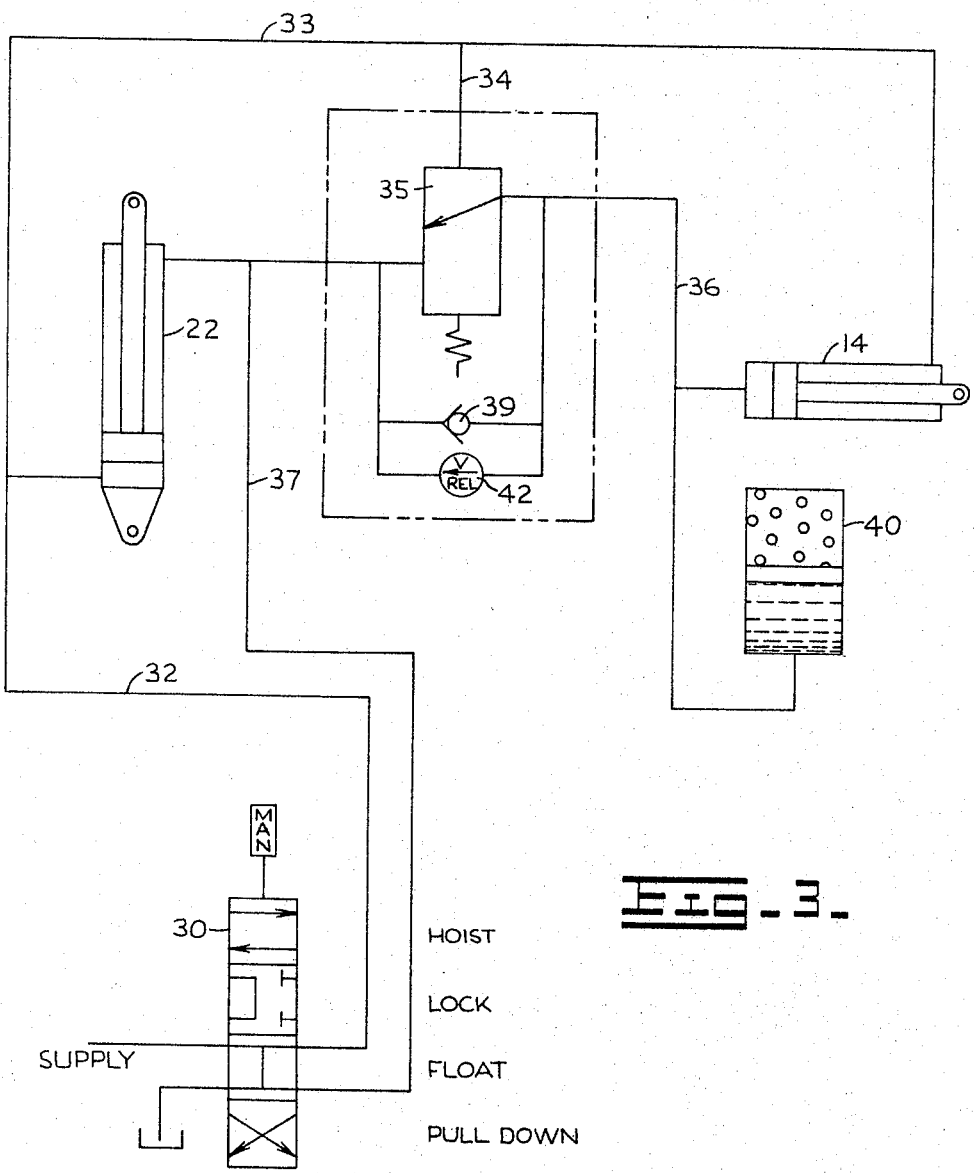

In the drawings:
FIG. 1 is a view in elevation of a truck having a dump body and tailgate embodying the present invention;
FIG. 2 is an enlarged fragmentary view with parts in section illustrating the operating mechanism for the gate; and
FIG. 3 is a schematic view of the hydraulic circuits which control raising and lowering the dump body and opening and closing of the gate.

Referring first to FIG. 1, the truck is illustrated as having a body 10 with a tailgate generally indicated at 11. The tailgate comprises a closure panel pivoted to the body as by forwardly extending brackets having pivotal connections, one of which is shown at 12, it being understood that the other pivotal connection is on the opposite side of the body in axial alignment with the pivot 12. The pivot 12 is disposed above the bottom of the gate and forwardly on the body so that upon downward swinging movement of the gate it will occupy the broken line position illustrated in FIG. 2 with the lower portion, being nearly one-half the height of the gate, disposed beneath the body member. This has two advantages, first that part of the gate which is beneath the body member is protected against the abrasive and damaging action of large rock and the like which is being discharged from the body; and the second advantage is that the extreme upper end of the gate which in its lower condition is the rear extremity of the dump body will have greater ground clearance than with a gate that is pivoted adjacent its lower edge.

The gate of the present application is swung between its open and closed position by a hydraulic jack 14 pivotally supported with respect to the truck body by trunnions 15 on brackets 16 welded to the bottom of the body. The rod of the jack is pivotally connected as at 17 to a bracket 18 extending downwardly from the bottom of the gate. As is apparent in FIG. 2, fluid under pressure directed to the rod end of the jack will swing the gate to the open position illustrated in broken lines, and fluid directed to the head end of the jack will swing the gate back toward its closed position.

In accordance with the present invention, the gate may be swung to its open position automatically upon hoisting or raising the body to its dump position and closed automatically upon lowering of the body. There is also a float position for the body actuating mechanism in which no change will take place in the position of the gate and a locked position of the body having no effect on the gate position.

As shown in FIG. 1, the body 10 is pivotally supported for movement between the carry position shown and a dump position as on pivot pins 20. A jack 22 extending between a pivotal connection 24 with the body and a pivotal connection 26 with a bracket 28 on the frame is provided for raising the body to its dump position. The hydraulic circuits for the body control and gate control are shown in FIG. 3, wherein fluid under pressure from a suitable source of supply is controlled by a manually actuated valve 30 for direction to the jacks 22 and 14 in the following manner:

When the valve 30 is moved to its hoist position for dumping the contents of the body, pressure is communicated through a line 32 to the head end of the jack 22; however, since the body, particularly when loaded, is very heavy, pressure in the same line will be communicated through a line 33 to the rod end of the jack 14 for opening the gate which will usually be fully opened before the body attains its dump position. The pressure in line 33 is also communicated by a branch line 34 to a spring closed valve 35 to move it to an open position, communicating the head end of jack 14 with a line 36 and through the valve 35 to a line 37 which communicates the head end of jack 14 as well as the rod end of jack 22 to the source.

Retraction of the jack 22 when accomplished by moving the valve 30 to the pull-down position, is accompanied by closing of the gate which again occurs in the early part of the lowering movement of the body. As the schematic illustration shows, the pull-down position of the valve 30 communicates pressure from the source to a line 37 and to the rod end of jack 22. It also communicates pressure through a check valve 39 in a line which bypasses the valve 35, communicating pressure to the line 36 and the head end of jack 14 for closing the gate.

The float position of the valve 30, which is that position shown, permits the body to move downwardly under its own weight and does not directly effect the position of the gate which is normally open when the body is raised. As shown, the float position communicates the opposite ends of jack 22 with each other and communicates the supply with the source. Consequently, the weight of the body has only to expel fluid from the head end of jack 22 which also communicates with the source. Should it be desirable to close the gate either before, during or after the body has reached its lower-most position, a momentary shifting of the valve 30 to the pull-down position will communicate sufficient pressure in the manner before described to the head end of the jack 14 for closing the gate.

In the lock position of the valve 30, the fluid under pressure is communicated back to source and the lines to the head end and rod end of jack 22 are closed so that the body may be held in any position in which it has been left. This position of the valve has no effect on the position of the gate, but the gate may be controlled by momentary movement of the valve 30 to the hoist position, which affects opening of the gate, or to the pull-down position which affects closing of the gate.

The gate and its supporting and actuating mechanisms are protected against damage when unusual forces are applied, such as in loading large, heavy articles, first by an accumulator 40 which may be of any suitable air-over-oil type, and provides a cushion making possible slight movement without damage to the gate. Greater shocks which cannot be accommodated by the accumulator may be relieved by a check valve 42 designed to relieve excessive pressure from the head end of jack 14 directing them toward the source.

From the foregoing, it is apparent that while the tailgate is, generally speaking, automatically controlled in response to raising and lowering of the truck body, it may also be opened or closed at the will of the operator under conditions where such opening or closing may be desirable.

We claim:

1. A tailgate for a vehicle dump body comprising a closure panel at the rear end of the body, forwardly extending brackets on said panel, and pivotal connections between the brackets and the body at points forwardly on the body and above the bottom but closer to the bottom than the top permitting the gate to swing to an open position with a substantial portion of the gate panel disposed beneath the body.

2. The combination of claim 1 with a bracket extending downwardly from the bottom of the gate, and a power actuated extensible link between the bracket and the body for swinging the gate between open and closed positions.

3. In combination with a truck having a rear dump body and a tailgate therefor, a hydraulic motor to hoist and lower the body, a hydraulic motor to open and close the gate, a circuit for hydraulic fluid under pressure including said motors, a valve in said circuit to direct fluid to the motors to hoist the body and open the gate and alternately to lower the body and close the gate, means in the circuit to insure that opening of the gate precedes hoisting of the body and closing of the gate precedes lowering of the body, said valve having a lock position to hold the body in any desired position without affecting the gate, and a float position to permit the body to descend by gravity without affecting the gate.

References Cited

UNITED STATES PATENTS

| | | | |
|---|---|---|---|
| 1,961,193 | 6/1934 | Brumbaugh | 298—23 X |
| 1,983,280 | 12/1934 | Flowers. | |
| 2,072,998 | 3/1937 | Allin | 298—23 X |
| 2,120,967 | 6/1938 | Eisenberg. | |
| 3,054,160 | 9/1962 | Le Tourneau | 296—57 |
| 3,235,310 | 2/1966 | Medley | 298—23 |
| 3,254,919 | 6/1966 | Birchmeier | 298—23 |

BENJAMIN HERSH, *Primary Examiner.*

RICHARD J. JOHNSON, *Examiner.*